(12) United States Patent
Leutgeb et al.

(10) Patent No.: US 9,754,141 B2
(45) Date of Patent: Sep. 5, 2017

(54) ANTENNA ARRANGEMENT AND METHOD FOR OPERATING AN ANTENNA ARRANGEMENT

(71) Applicant: Infineon Technologies AG, Neubiberg (DE)

(72) Inventors: Thomas Leutgeb, Lieboch (AT); Walter Kargl, Graz (AT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 14/731,457

(22) Filed: Jun. 5, 2015

(65) Prior Publication Data
US 2015/0356334 A1    Dec. 10, 2015

(30) Foreign Application Priority Data
Jun. 6, 2014 (DE) .................. 10 2014 108 050

(51) Int. Cl.
G06K 7/00 (2006.01)
G06K 7/10 (2006.01)
H01Q 1/22 (2006.01)
H01Q 7/00 (2006.01)
H01Q 21/30 (2006.01)

(52) U.S. Cl.
CPC ..... G06K 7/10356 (2013.01); G06K 7/10336 (2013.01); H01Q 1/2216 (2013.01); H01Q 7/00 (2013.01); H01Q 21/30 (2013.01)

(58) Field of Classification Search
CPC .. G07F 7/1008; G06Q 20/341; G06K 7/0008; G06K 13/08; G06K 19/07749; B42D 15/10

USPC ................. 235/380, 439, 487, 492
See application file for complete search history.

(56) References Cited

U.S. PATENT DOCUMENTS

| 6,137,447 A | 10/2000 | Saitoh et al. |
| 8,991,712 B2* | 3/2015 | Finn ................. G06K 19/07794 235/492 |
| 2007/0147224 A1* | 6/2007 | Bigley ............... G08B 13/2414 369/290.1 |
| 2015/0278675 A1* | 10/2015 | Finn ................. G06K 19/07769 235/492 |

FOREIGN PATENT DOCUMENTS

| DE | 19715215 C1 | 10/1998 |
| DE | 69635792 T2 | 10/2006 |

* cited by examiner

*Primary Examiner* — Karl D Frech
(74) *Attorney, Agent, or Firm* — Viering, Jentschura & Partners mbB

(57) ABSTRACT

In various embodiments, an antenna arrangement is provided. The antenna arrangement includes a first antenna and a second antenna. The first antenna and the second antenna are arranged substantially in the same plane. The first antenna and the second antenna are arranged with respect to one another in such a manner that an intermediate area is defined between the first antenna and the second antenna. The antenna arrangement further includes a controller which is configured to control the first antenna and the second antenna in such a manner that a magnetic field produced in the intermediate area is greater, in terms of magnitude, than the magnetic field generated by the first antenna in the intermediate area and the magnetic field generated by the second antenna in the intermediate area.

17 Claims, 2 Drawing Sheets

ANTENNA ARRANGEMENT AND METHOD FOR OPERATING AN ANTENNA ARRANGEMENT

CROSS-REFERENCE TO RELATED APPLICATION

This application claims priority to German Patent Application Serial No. 10 2014 108 050.5, which was filed Jun. 6, 2014, and is incorporated herein by reference in its entirety.

TECHNICAL FIELD

Various embodiments relate generally to an antenna arrangement and a method for operating an antenna arrangement.

BACKGROUND

In communication systems having a master apparatus and one (or more) slave apparatus(es), that is to say having a reader as the master apparatus and having a conventional contactless chip card as the slave apparatus for example, the situation may occur in which the chip card is moving during the reading or communication process, for example on a circular path in the vicinity of the reader. Conventional antennas in readers are nowadays usually rectangular (with rounded corners) or circular. This may result in the magnetic coupling between the communicating apparatuses varying and becoming very weak under certain circumstances, in particular in the case of an increasing distance between the axis of rotation, around which the chip card rotates, and the chip card itself since this is associated with an ever increasing fluctuation in the interval of time between the chip card and the reader.

SUMMARY

In various embodiments, an antenna arrangement is provided. The antenna arrangement includes a first antenna and a second antenna. The first antenna and the second antenna are arranged substantially in the same plane. The first antenna and the second antenna are arranged with respect to one another in such a manner that an intermediate area is defined between the first antenna and the second antenna. The antenna arrangement further includes a controller which is configured to control the first antenna and the second antenna in such a manner that a magnetic field produced in the intermediate area is greater, in terms of magnitude, than the magnetic field generated by the first antenna in the intermediate area and the magnetic field generated by the second antenna in the intermediate area.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
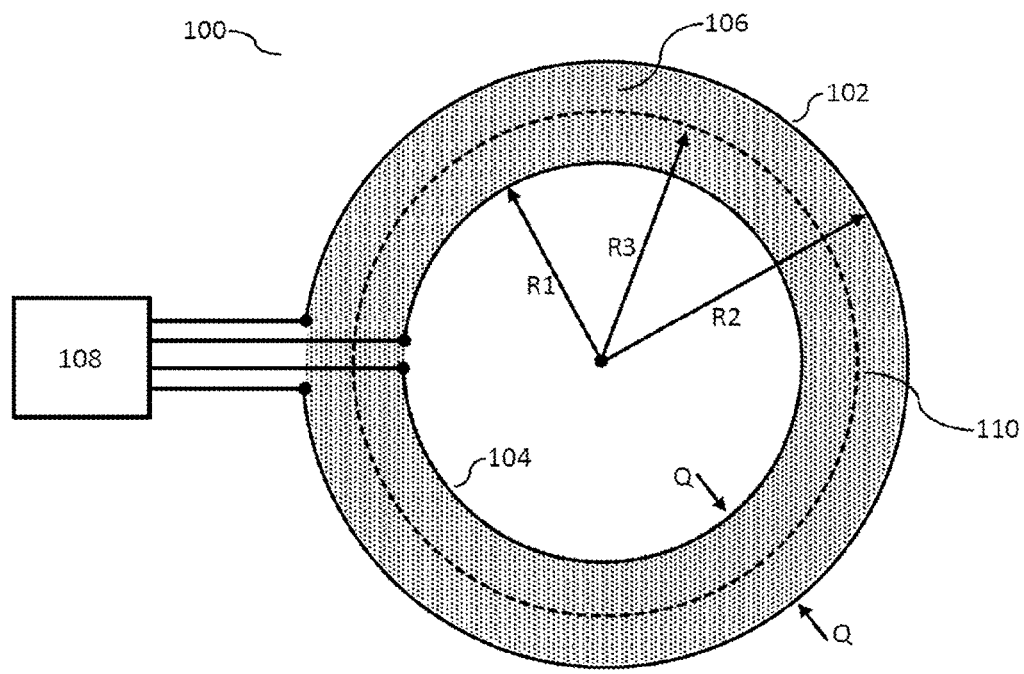
FIG. 1 shows an antenna arrangement according to various embodiments.

The following detailed description refers to the accompanying drawings that show, by way of illustration, specific details and embodiments in which the invention may be practiced.

In this respect, direction terminology, for instance "at the top", "at the bottom", "at the front", "at the rear", "front", "rear", etc., is used with respect to the orientation of the described figure(s). Since components of embodiments can be positioned in a number of different orientations, the direction terminology is used for illustration and is not restrictive in any way. It goes without saying that other embodiments can be used and structural or logical changes can be made without deviating from the scope of protection of the present invention. It goes without saying that the features of the various embodiments described herein can be combined with one another unless specifically indicated otherwise. Therefore, the following detailed description should not be interpreted in a restrictive sense, and the scope of protection of the present invention is defined by the attached claims.

Within the scope of this description, the terms "linked", "connected" and "coupled" are used to describe both a direct and an indirect link, a direct or indirect connection and direct or indirect coupling. In the figures, identical or similar elements are provided with identical reference symbols if expedient.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

An antenna structure (also referred to as an antenna arrangement) which can be used in a reader is provided in different embodiments. The antenna structure is adapted or designed for communication with a chip card moving on a round, for example circular, path to the effect that the (inductive) coupling between the reading apparatus (in other words the reader) and the chip card moving on the circular path can be kept substantially constant. In order to achieve this, the antenna structure may be designed in such a manner that the magnetic coupling field is concentrated in an annular region parallel to the antenna structure plane between two concentrically arranged rings having two different radii, the rings being able to be antennas. In other words, the antenna structure may be designed in such a manner that it generates a magnetic field which, inside an area between two concentrically arranged circles of different radii, is greater, in terms of magnitude, than the magnetic field outside precisely this annulus, the annulus being able to be in a plane which is parallel to the plane of the antenna structure. If the substantially round, for example circular, movement path of the chip card runs inside this annulus, the coupling between the chip card and the reading apparatus can be kept virtually constant since the power emitted by the antenna structure is concentrated on the annular region in which the chip card is then substantially constantly situated.

It should be noted that the principle described as part of this description is not restricted to a communication system comprising a chip card (also called smart card) and an associated reader, which is cited as one of many possible systems. A chip card, as stipulated in the ISO/IEC 7810 and in the ISO/IEC 7816 standard for example, may be a contactless chip card or at least a chip card which, in addition to contact-based communication by contact areas arranged thereon, may also inductively communicate in a contactless manner with a reading apparatus, that is to say by an antenna. A chip card having a contact-based interface and a contactless interface is also referred to as a dual interface card. A dual interface chip card may have a chip card module which may have a chip and a chip card antenna (also referred to as a chip card module antenna in this case) which is arranged thereon and is in the form of a coil which has conductor track turns, performs the function of an antenna and enables contactless communication. In the case of a system which communicates at least wirelessly, the reading apparatus is also referred to as a PCD (proximity coupling device) and an associated contactless chip card is referred to as a PICC (proximity integrated circuit card). The communication frequency of such a system may be, for example, 13.56 MHz according to the ISO/IEC 14443 standard, which corresponds to one of the frequencies of the RFID (radio-frequency identification) standard in the shortwave range. In this case, an associated card or the associated chip card module can also be referred to as an RFID tag.

However, the presence of a fully adequate chip card, that is to say a chip card body with a chip card module embedded therein, is not a prerequisite for using the embodiments described here. Uses in which only the chip card module (or parts thereof, for example the chip as an electrical circuit and an associated antenna), which is clearly the heart of the chip card and is embedded in the chip card body of the chip card, is also introduced onto or into other apparatuses, for example onto data storage media such as CD-ROMs, DVD-ROMs or Blu-ray media or, for instance, wheels of means of transportation or turbine rotors, generally onto motors of mechanical systems in summary, are likewise conceivable.

It should also be emphasized that, within the scope of this description, a round, for example circular, orbit or movement path can also be understood as meaning corresponding orbits which are round, for example substantially circular, that is to say differ from the strictly geometrical circular form. Therefore, it is possible to provide, for example, oval movement paths or the like which oscillate around a circular path with a certain amplitude and therefore on average represent a circular path, for example, but no restriction to symmetrical deviations from the circular path is intended to be effected here. The deviations from the circular path may also occur irregularly or with scattering. Within the scope of this description, a substantially circular path can be understood as meaning a motion path which runs in a virtually circular or oval manner with or without regular oscillatory or irregular deviations from this virtually circular or oval movement path, this path being able to be geometrically restricted by an annulus. In other words, within the scope of this description, a substantially circular orbit or movement path can be understood as meaning an orbit which runs inside a region which is restricted by two circles arranged concentrically in one another.

An antenna arrangement having a first antenna, a second antenna and a controller is provided in various embodiments. The first antenna and the second antenna may be arranged substantially in the same plane, the first antenna and the second antenna being able to be arranged with respect to one another in such a manner that an intermediate area is defined between the first antenna and the second antenna. The controller may be set up to control the first antenna and the second antenna in such a manner that a magnetic field produced in the intermediate area is greater, in terms of magnitude, than the magnetic field generated by the first antenna in the intermediate area and the magnetic field generated by the second antenna in the intermediate area.

The property whereby the first antenna and the second antenna may be arranged substantially in the same plane can be understood as meaning the fact that the first antenna (for example the conductor track(s) forming it) defines a first plane or is arranged in the latter and the second antenna defines a second plane or is arranged in the latter. The first plane and the second plane may be identical or may be parallel to one another at a distance. For example, it may prove to be advantageous to arrange each of the antennas on a respective film or carrier. During component production, the two films or carriers can then be adjacent to one another but strictly speaking at a distance from one another which is determined by the thickness of the carriers or films. In such a case, the first antenna and the second antenna would have a vertical offset with respect to one another. Within the scope of this description, the two antennas are considered to be arranged substantially in the same plane, in which case vertical distances between the planes of the two antennas of up to approximately 10 mm for example, of up to approximately 8 mm for example, of up to approximately 6 mm for example, of up to approximately 5 mm for example, of up to approximately 4 mm for example, or of up to approximately 3 mm for example can be considered to be insignificant since they do not have any significant disadvantages/effects for the technical implementation.

The magnetic field produced in the intermediate area during operation of the antenna arrangement corresponds to a superimposition of the magnetic field generated by the first antenna and the magnetic field generated by the second antenna. In this case, from an overall point of view, the magnetic field in the intermediate area is greater, in terms of magnitude, than the magnetic field outside the intermediate area.

According to further embodiments of the antenna arrangement, the first antenna and the second antenna may be arranged substantially at a constant distance from one another.

According to further embodiments of the antenna arrangement, the first antenna and the second antenna may each form a loop antenna. The first antenna and/or the second antenna may have one or more turns.

According to further embodiments of the antenna arrangement, the first antenna and the second antenna may be substantially circular. The circular form may be considered to be an advantageous adaptation of the geometry of the antenna arrangement in order to provide a magnetic field as a coupling field which is substantially constant on temporal average on a circular path running in the intermediate area. If necessary, however, deviations from the circular form may also be provided, provided that the circular path of the moving apparatus, which is intended to couple to the coupling field, is within the oval intermediate area.

According to different embodiments of the antenna arrangement, the controller may be set up to control the first antenna and the second antenna with electrical currents having phases which are shifted with respect to one another, for example phases which are substantially opposite one another. In other words, the phase shift between the two alternating currents, each of which is injected into a respective antenna by means of the controller, may be Pi, for example. In one refinement, the phase shift can be used as a control parameter in order to compensate for possible electrical differences in the two supply circuits.

Various embodiments also provide an arrangement having the antenna arrangement just described, a carrier having an electrical circuit and an antenna which is coupled to the electrical circuit and is intended to provide the electrical circuit with energy, and a holding device for holding the carrier. The holding device may be set up to position and/or move the carrier relative to the antenna arrangement in such a manner that the antenna of the carrier is supplied with energy substantially using the magnetic field generated in the intermediate area of the antenna arrangement. In addition to supplying energy, the magnetic field can also be used to transmit data between a reading unit and the electrical circuit.

The holding device may be any desired mechanical system which is suitable for accommodating or holding the carrier and additionally moving it or allowing its movement in such a manner that the electrical circuit and the antenna substantially describe a path which is geometrically contained in the intermediate area. In this case, the plane defined by the carrier may be arranged parallel to the plane of the antennas, for example, but at a distance from said plane. The holding device may be, for example, a wheel suspension in a vehicle or a drive plug-in unit for a DVD-ROM or a Blu-ray disc.

According to further embodiments of the arrangement, the carrier may be round, for example circular. The carrier may therefore be, for example, round, for example circular, bodies which are designed for rotation, for example vehicle wheels, ring gears or turbine rotors, for instance. In order to mention further examples, the carrier may be a data storage medium, for example an optical data storage medium. These include, for example, all formats (for instance conventional formats and mini formats) of CD-ROMs, DVD-ROMs and Blu-ray discs.

According to further embodiments, the arrangement may have a reader for reading the carrier, the antenna arrangement being part of the reader. The reader may be arranged in a stationary manner and may be used to read the electrical circuit arranged on the carrier, for example moving on a circular path. The magnetic field which can be generated by the antenna arrangement of the reader can be used both to provide the electrical circuit with energy and to communicate with said circuit. The circuit may additionally have a sensor and/or an actuator which can be monitored and/or activated during rotation of the carrier. In this case, it may be advantageous if, despite the rotation of the carrier, the magnetic coupling between the antenna coupled to the electrical circuit and the magnetic field does not fluctuate, with the result that it is possible to continuously monitor/communicate with the electrical circuit and/or provide the electrical circuit with energy without disruption. This can be achieved by means of the specific design of the antenna structure which has already been described above.

Various embodiments also provide a method for operating the antenna arrangement, the antenna arrangement having the first antenna, the second antenna, with the first antenna and the second antenna being arranged substantially in the same plane and the first antenna and the second antenna being arranged with respect to one another in such a manner that an intermediate area is defined between the first antenna and the second antenna, and the controller which is electrically coupled to the first antenna and the second antenna. The method comprises controlling the first antenna and the second antenna by the controller in such a manner that a magnetic field produced in the intermediate area is greater, in terms of magnitude, than the magnetic field generated by the first antenna in the intermediate area and the magnetic field generated by the second antenna in the intermediate area.

According to further embodiments of the method for operating an antenna arrangement, the control of the first antenna and of the second antenna may include controlling the first antenna with a current having a first phase and controlling the second antenna with a current having a second phase, the first phase and the second phase being shifted with respect to one another, for example being substantially opposite one another.

Various embodiments also provide a method for operating the arrangement. The arrangement may have the antenna arrangement. The carrier may have the electrical circuit and the antenna which is coupled to the electrical circuit, and the holding device for holding the carrier. The method for operating the arrangement comprises positioning and/or moving the carrier relative to the antenna arrangement in such a manner that the antenna of the carrier is supplied with energy substantially using the magnetic field generated in the intermediate area of the antenna arrangement.

FIG. 1 illustrates a plan view of an exemplary antenna arrangement 100. This arrangement has a first antenna 102 and a second antenna 104. Both the first antenna 102 and the second antenna 104 are electrically coupled to a controller 108. The first antenna 102 and the second antenna 104 are arranged relative to one another in such a manner that an intermediate area 106 is defined between the first antenna 102 and the second antenna 104. In this example, both antennas are circular and are arranged concentrically with respect to one another, the first antenna 102 having a circular form with a first radius R1 and the second antenna 104 having a circular form with a second radius R2. The form of the intermediate area 106 is therefore predefined by the form of the antennas 102, 104.

The antenna arrangement 100 according to various embodiments, which may be part of a reader, is set up, by suitably supplying current to the two antennas 102, 104, to generate a high-frequency magnetic field in such a manner that, during operation, the magnetic field produced in the intermediate area 106 is greater, in terms of magnitude, than the magnetic field generated by the first antenna 102 in the intermediate area 106 and the magnetic field generated by the second antenna 104 in the intermediate area 106. A circuit accordingly set up for this purpose, for example a transponder such as an RFID transponder, can then inductively couple to this resulting magnetic field in the intermediate area 106, for example. The antenna arrangement 100 according to various embodiments may have the property whereby it enables constant coupling to a transponder which is in motion at a distance from the antenna arrangement 100 on a substantially circular path 110. One possible path 110 with an associated radius R3 is depicted in FIG. 1. If the circular path 110 is arranged concentrically with respect to the first antenna 102 and the second antenna 104, the instantaneous magnetic field is constant along such a circular path 110 at any time (the coupling field can fluctuate as a whole over time if an alternating magnetic field is involved here). The movement of the transponder on the circular path 110 then does not have any negative effect on the coupling between the transponder and the antenna arrangement 100 according to various embodiments.

Figure 2:
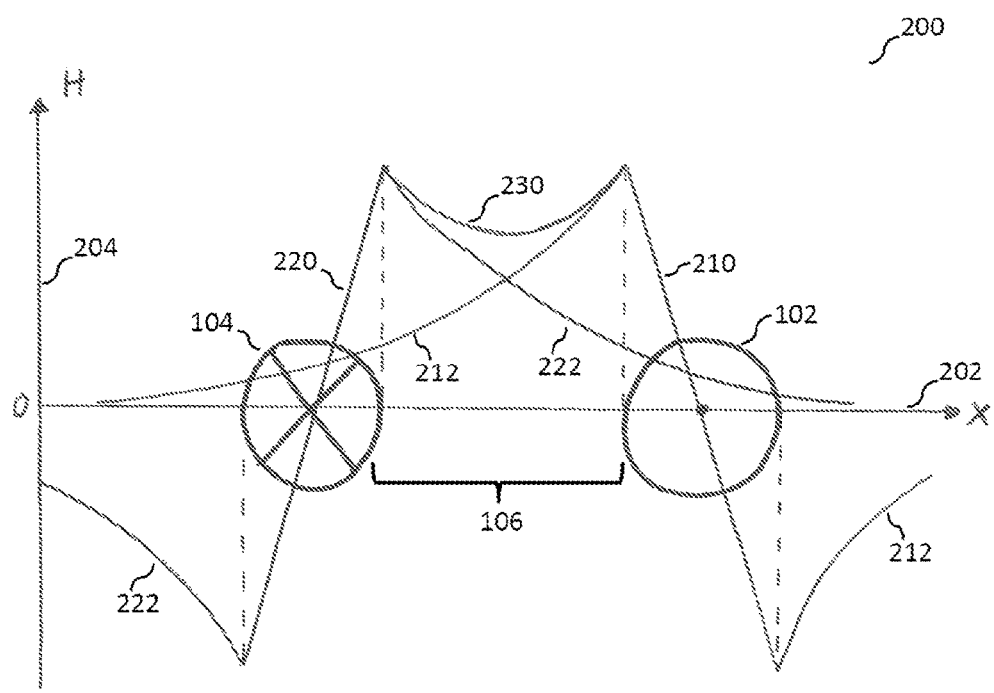
FIG. 2 shows a snapshot of the field distribution in a region of the antenna arrangement according to various embodiments.

FIG. 2 shows a graph 200 illustrating the instantaneous profile of the magnetic field strength H in a plane arranged perpendicular to the antennas 102, 104, for example at that location in FIG. 1 which is indicated using two arrows Q. The cross sections of the two antennas 102, 104 are additionally illustrated. The x axis 202 of the graph is used for the spatial resolution and the y axis 204 denotes the magnetic field strength H. The exact values have not been stated since the focus here is on a qualitative representation of the situation. It is also emphasized that the proportions do not reflect the actual proportions of the components since the cross sections of the antennas 102, 104, for example, are illustrated in a considerably enlarged manner in order to be able to better illustrate the underlying functional principle.

The basis used for explaining the instantaneous strength of the magnetic field in FIG. 2 is the situation in which the current directions through the two antennas 102, 104 are opposite, with the result that, for instance, the current in the first antenna 102 emerges from the plane of the drawing, whereas the current in the second antenna 104 flows into the plane of the drawing. In the case of a phase shift of Pi, the directions of current flow through the antennas 102, 104 are always opposing. The greater the deviation of the phase shifts from Pi, the greater the proportion of time in the period of the frequency of the magnetic field during which the directions of current flow through the antennas 102, 104 are the same.

Starting from the center of an electrical line to its edge, a magnetic field strength H generated therein by a current flow I increases linearly with the distance r from the center of the line to its edge, $H(r) \sim I \cdot r$. From the edge of the electrical line, the magnetic field strength H then falls in a non-linear manner with increasing distance r from the center of the line, $H(r) \sim I/r$. When applied to the antennas 102, 104, it can be concluded that the magnetic field strength profile of the first antenna 102 has a first linear region 210, which reflects the magnetic field strength profile inside the first antenna 102, and a first non-linear region 212 which in turn has the two sections to the left and right of the antenna conductor, the magnetic field strength falling with increasing distance from the center point of the antenna conductor in each of these sections according to $\sim 1/x$. The situation is similar with the magnetic field strength profile of the second antenna 104 which has a second linear region 220, which reflects the magnetic field strength profile inside the second antenna 104, and a second non-linear region 222 which in turn has the two sections to the left and right of the antenna conductor. The mathematical sign of the magnetic field strength H takes into account the orientation of the magnetic flux density which obviously points in opposite directions on opposite sides of the antenna conductor and is ultimately conventional.

The region between the first antenna 102 and the second antenna 104 in FIG. 2 corresponds to the one-dimensional projection of the intermediate area 106 illustrated in FIG. 1. As illustrated in the graph 200, the magnetic field prevailing therein is a superimposition of the magnetic field of the first antenna 102 and the magnetic field of the second antenna 104. Since the directions of current flow through the antennas 102, 104 are opposite one another, the magnetic fields of the two antennas 102, 104 have the same orientation in the region of the intermediate area 106, with the result that they are additively/constructively superimposed. The resulting magnetic field strength 230 in the region of the intermediate area 106 is therefore always greater than the field strength generated by the antenna arrangement outside the intermediate area 106. This statement possibly applies only in terms of magnitude depending on the mathematical sign of the resulting magnetic field strength inside and outside the intermediate area 106. However, based on the magnetic flux, this is always denser/greater in the region of the intermediate area 106 than outside the intermediate area 106.

If a circular path 110 on which a transponder moves therefore additionally runs concentrically with respect to the first antenna 102 and/or the second antenna 104 inside the intermediate area 106, the amplitude of the magnetic field strength (in the snapshot) is constant along this circular path 110. The graph 200 additionally shows that the curvature of the resulting field strength 230 inside the intermediate area 106 is very flat, e.g. in the center between the first antenna 102 and the second antenna 104, that is to say the resulting field strength 230 does not change very much locally in this region. A possible offset between the circular path 110 and its concentric arrangement with the first antenna 102 and the second antenna 104 therefore does not have any effect or has only a marginal effect on the resulting coupling between the antenna arrangement 100 and the transponder. In other words, a transponder whose circular path 110 is offset from its position illustrated in FIG. 1 or even corresponds to an oval but still runs inside the intermediate area 106 will not experience any variation or will experience only a marginal and therefore technically negligible variation in the amplitude of the magnetic field strength H. This inherent property of the antenna arrangement 100 according to various embodiments can therefore allow greater manufacturing tolerances, for example, in corresponding technical systems which use the principle of the antenna arrangement 100 presented here. If necessary and with appropriate dimensioning of the antennas 102, 104, the movement path 110 can be generalized as a motion path which comes about as a result of a random movement running at least in one direction provided that this motion path can be limited by an annulus which in turn is in the intermediate area 106.

In further embodiments of the antenna arrangement, the form of the first antenna 102 and the form of the second antenna 104 may differ from the circular form. The form of the antennas can be adapted to the movement path of the transponder within a certain framework and may be oval or rectangular with rounded corners, for example.

Figure 3:
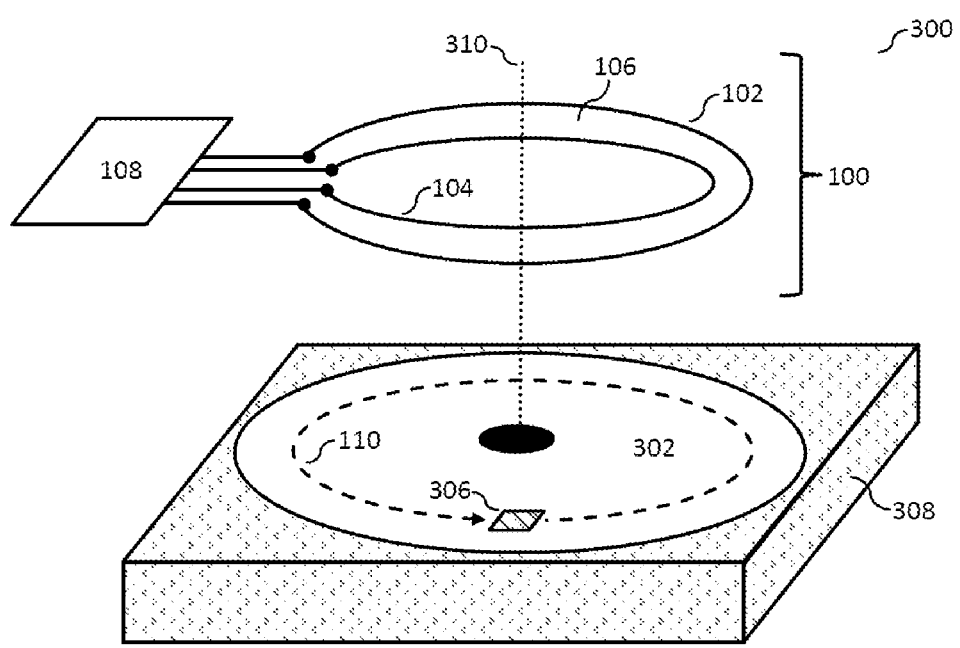
FIG. 3 shows an arrangement according to various embodiments.

FIG. 3 illustrates an arrangement 300 according to various embodiments which is explained using one of many possible usage environments of the antenna arrangement 100 according to various embodiments. The arrangement 300 has the antenna arrangement 100 according to various embodiments which is not described again. The arrangement 300 according to various embodiments additionally has a carrier 302 having an electrical circuit 306 and an antenna (not explicitly illustrated, combined with the electrical circuit 306 in FIG. 3) which is coupled to the electrical circuit and is intended to provide the electrical circuit 306 with energy, and a holding device 308 for holding the carrier 302, the holding device 308 being set up to position and/or move the carrier 302 relative to the antenna arrangement 100 in such a manner that the antenna of the carrier 302 is supplied with energy substantially by means of the magnetic field generated in the intermediate area 106 of the antenna arrangement 100. As already mentioned, in addition to supplying energy, the magnetic field can also be used for communication between the antenna arrangement 100 according to various embodiments and the electrical circuit 306.

The carrier 302 having the electrical circuit 306 together with the antenna and the holding apparatus 308 are assigned to a practical exemplary use in FIG. 3 as additional elements which develop the antenna arrangement 100 according to various embodiments to form the arrangement 300 according to various embodiments. It is emphasized that these elements should be considered to be superficially entirely abstract, however, and can be assigned to any system in which the antenna arrangement 100 is used to enable the provision of energy and/or data interchange between the antenna arrangement 100 and a transponder moving on a circular or round path. In the example shown in FIG. 3, the holding device 308 is set up to hold and rotate the carrier 302 which, in this example, is an optical data storage medium, for example a DVD-ROM. In this case, the carrier 302 rotates about an axis of rotation 310 which may also correspond to a midpoint axis of the two antennas 102, 104 of the antenna arrangement 100, for example, and therefore also constitutes the axis of rotation of the electrical circuit 306. Together with the carrier 302, the electrical circuit 306 arranged thereon also rotates on the circular path 110 depicted which runs inside the intermediate area 106 projected onto the carrier 302. It may be advantageous if, in the arrangement 300 according to various embodiments, the plane defined by the carrier 302 and the substantially identical plane of the two antennas 102, 104 are oriented parallel to one another in order to keep the fluctuations of the amplitude of the magnetic field strength H along the circular path 110 of the electrical circuit and of the antenna connected thereto as low as possible. The antenna apparatus 100 according to various embodiments may be arranged at a distance (vertical distance) from the holding apparatus 308 and therefore also from the carrier 302 and may be part of a reader. An increasing vertical distance causes the resulting magnetic field strength 230 to indeed be reduced inside the intermediate area 106 in the plane of the carrier 302 but it is still greater, at least in terms of magnitude, than the resulting magnetic field strength outside the intermediate area 106 in the plane of the carrier 302.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An antenna arrangement, comprising:
a first antenna;
a second antenna;
wherein the first antenna and the second antenna are arranged substantially in the same plane;
wherein the first antenna and the second antenna are arranged with respect to one another in such a manner that an intermediate area is defined between the first antenna and the second antenna;
a controller configured to control the first antenna and the second antenna in such a manner that a magnetic field produced in the intermediate area is greater, in terms of magnitude, than the magnetic field generated by the first antenna in the intermediate area and the magnetic field generated by the second antenna in the intermediate area; and
a carrier comprising an electrical circuit; and wherein the first antenna and/or the second antenna is coupled to the electrical circuit to provide the electrical circuit with energy.

2. The antenna arrangement of claim 1,
wherein the first antenna and the second antenna are arranged substantially at a constant distance from one another.

3. The antenna arrangement of claim 1,
wherein the first antenna and the second antenna are each forming a loop antenna.

4. The antenna arrangement of claim 1,
wherein at least one of the first antenna or the second antenna are substantially circular.

5. The antenna arrangement of claim 1,
wherein the controller is configured to control the first antenna and the second antenna with currents having phases which are shifted with respect to one another.

6. The antenna arrangement of claim 5,
wherein the controller is configured to control the first antenna and the second antenna with currents having phases which are substantially opposite one another.

7. The antenna arrangement of claim 1, wherein the controller is external to the magnetic field of the first antenna and the second antenna.

8. The antenna arrangement of claim 1, wherein the first antenna and the second antenna are directly coupled to the controller.

9. An arrangement, comprising:
an antenna arrangement, comprising:
a first antenna;
a second antenna;
wherein the first antenna and the second antenna are arranged substantially in the same plane;
wherein the first antenna and the second antenna are arranged with respect to one another in such a manner that an intermediate area is defined between the first antenna and the second antenna;
a controller which is configured to control the first antenna and the second antenna in such a manner that a magnetic field produced in the intermediate area is greater, in terms of magnitude, than the magnetic field generated by the first antenna in the intermediate area and the magnetic field generated by the second antenna in the intermediate area;
a carrier comprising an electrical circuit and an antenna which is coupled to the electrical circuit and is provides the electrical circuit with energy; and
a holding device for holding the carrier, the holding device being configured to at least one of position or move the carrier relative to the antenna arrangement in such a manner that the antenna of the carrier is supplied with energy substantially using the magnetic field generated in the intermediate area of the antenna arrangement.

10. The arrangement of claim 9,
wherein the carrier is circular.

11. The arrangement of claim 9,
wherein the carrier is a data storage medium.

12. The arrangement of claim 11,
wherein the data storage medium is an optical data storage medium.

13. The arrangement of claim 9, further comprising:
a reader for reading the carrier;
wherein the antenna arrangement is part of the reader.

14. A method for operating an antenna arrangement, the antenna arrangement comprising:

a first antenna;
a second antenna;
wherein the first antenna and the second antenna are arranged substantially in the same plane;
wherein the first antenna and the second antenna are arranged with respect to one another in such a manner that an intermediate area is defined between the first antenna and the second antenna;
a controller which is electrically coupled to the first antenna and the second antenna; and
a carrier comprising an electrical circuit; and wherein the first antenna and/or the second antenna is coupled to the electrical circuit to provide the electrical circuit with energy;

the method comprising:
controlling the first antenna and the second antenna by the controller in such a manner that a magnetic field produced in the intermediate area is greater, in terms of magnitude, than the magnetic field generated by the first antenna in the intermediate area and the magnetic field generated by the second antenna in the intermediate area.

15. The method of claim 14,
wherein the control of the first antenna and of the second antenna comprises:
controlling the first antenna with a current having a first phase,
controlling the second antenna with a current having a second phase, the first phase and the second phase being shifted with respect to one another.

16. The method of claim 15,
wherein the second antenna is controlled with a current having a second phase, the first phase and the second phase being substantially opposite one another.

17. A method for operating an arrangement,
the arrangement comprising:
a first antenna;
a second antenna;
wherein the first antenna and the second antenna are arranged substantially in the same plane;
wherein the first antenna and the second antenna are arranged with respect to one another in such a manner that an intermediate area is defined between the first antenna and the second antenna;
a controller which is electrically coupled to the first antenna and the second antenna;
a carrier comprising an electrical circuit and an antenna which is coupled to the electrical circuit and provides the electrical circuit with energy;
a holding device for holding the carrier,
the method comprising:
at least one of positioning or moving the carrier relative to the antenna arrangement in such a manner that the antenna of the carrier is supplied with energy substantially using the magnetic field generated in the intermediate area of the antenna arrangement.

\* \* \* \* \*